Aug. 15, 1967     A. O. RADKE ETAL     3,336,077
AUXILIARY SEAT
Filed March 7, 1966
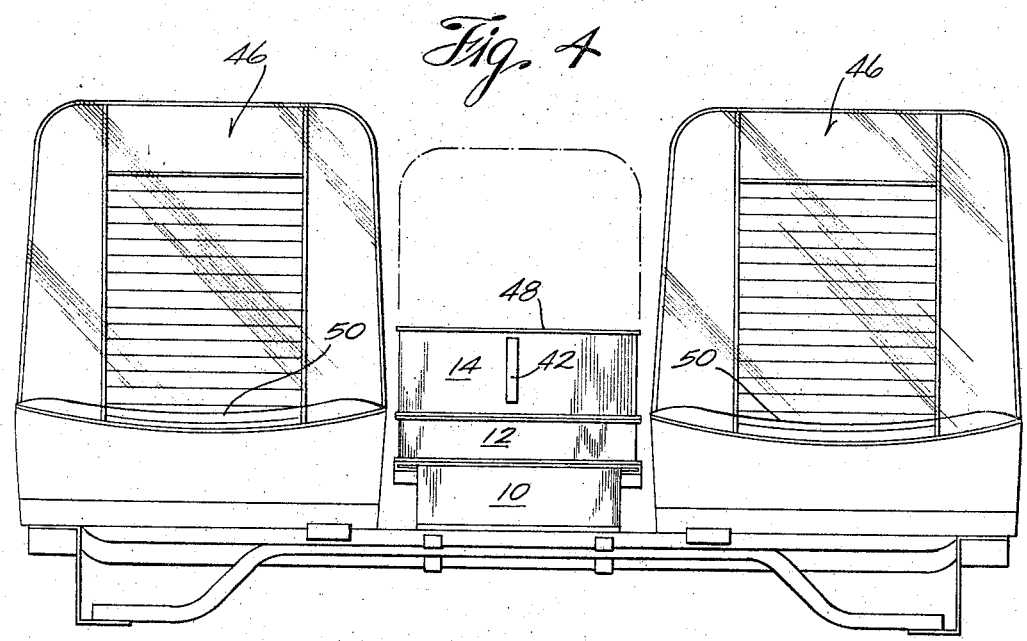
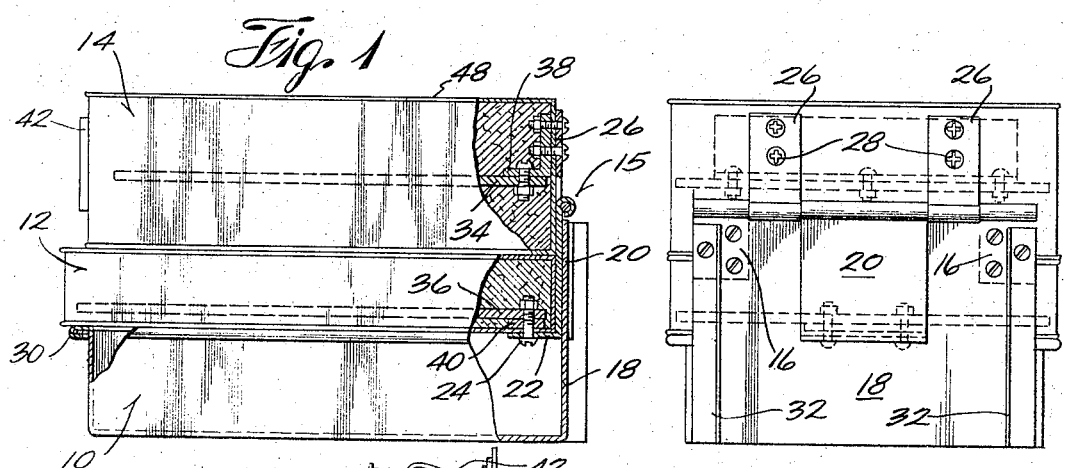
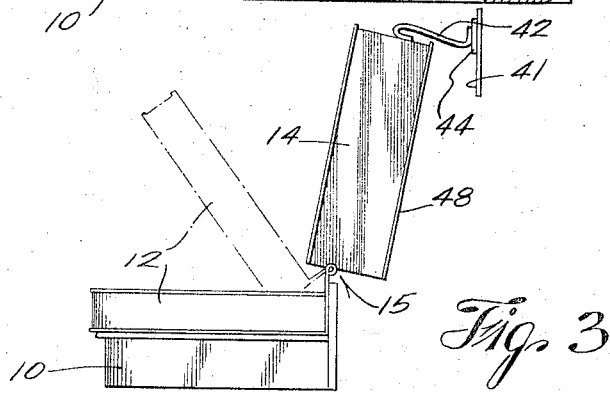
Inventors
Arthur O. Radke
William L. Wilton
By Andrew O. Riteris
Attorney

United States Patent Office 3,336,077
Patented Aug. 15, 1967

3,336,077
AUXILIARY SEAT
Arthur O. Radke, Shorewood, and William L. Wilton, New Berlin, Wis., assignors to Bostrom Corporation, Milwaukee, Wis., a corporation of Wisconsin
Filed Mar. 7, 1966, Ser. No. 541,420
2 Claims. (Cl. 297—193)

ABSTRACT OF THE DISCLOSURE

The vehicle seat embodying the present invention is comprised of a seat supporting structure, which may be in the form of an open-top box or container, and of two cushion members both of which are pivotally connected to the supporting structure at the rear of the seat. Both cushion members can be pivoted between a generally flat position, in which the top member overlies the bottom member, and an upstanding position in which the top cushion member forms a cushioned back part of the auxiliary seat and the bottom cushion member forms the seat part. By pivoting the bottom cushion member upwardly access can be had to the storage box which forms the supporting structure for the seat. With both cushion members in the generally flat position the auxiliary seat forms a hassock.

If the seat is positioned in the space between two regular vehicle seats, the top cushion member, when in the flat position, forms an arm rest for the adjacent seats. In this combination, if the top cushion is pivoted to the upwardly inclined position, the bottom cushion will be at the same general height as the seat cushions of the adjacent seats, and thereby will form with the seat cushions of the adjacent regular seats an elongated cushioned area which can be utilized as a sleeping or resting space for the truck driver or machine operator.

Summary

This invention pertains to improvements in vehicle seats and is particularly directed to an auxiliary seat which is relatively small in size and may be positioned adjacent a regular full sized vehicle or machine seat.

In view of the above the principal object of the present invention is to provide an auxiliary vehicle seat having the multiple purpose of forming a hassock, a seat, and a storage box.

A further object of the present invention is to provide the combination of an auxiliary seat, as described above, with adjacent regular seat means which combination will provide an arm rest for the adjacent seat means as well as a sleeping or resting area as explained above.

Other objects and advantages will be pointed out in, or be apparent from, the specification and claims, as will obvious modifications of the two embodiments shown in the drawings, in which:

FIG. 1 is a side view of the auxiliary seat embodying the present invention, with portions being broken away to provide a cross-sectional side view of the hinge and supporting structure;

FIG. 2 is a back plan view of the auxiliary seat shown in FIG. 1;

FIG. 3 is a side plan view of the seat shown in FIG. 1, in a diminished scale, showing the top cushion member in the upwardly inclined position, and showing the bottom cushion in broken lines in a position giving access to the box type supporting structure; and FIG. 4 is a front plan view of the auxiliary seat in combination with two adjacent regular vehicle seats.

The auxiliary seat embodying the present invention is shown in FIG. 1 and is essentially comprised of an open box type supporting structure 10, a first cushion member 12, and a second cushion member 14. Both cushions are connected to the base structure by a hinge 15 which has its two end leaves 16 fixed to the upstanding back panel 18 of the supporting structure. The central hinge leaf 20 extends downwardly and has an inwardly turned flange 22 which is fixed to the bottom cushion 12 by screws 24. The intermediate leaves 26 are fixed to the top cushion by screws 28.

The supporting structure is in the shape of an open-top metal box or container. The top edges of the side and front panels of the box are flanged outwardly to provide horizontally extending U-shaped supporting area for the cushions. The flanges may be covered with a vinyl bead 30 or a similar means for preventing exposure of the flange edges. The back panel 18 is reinforced by two upstanding angle members 32.

Each cushion member has a central relatively rigid frame which is surrounded by foam or similar padding which in turn is covered by an appropriate skin. In the illustrated case the frame of each cushion member can be a plywood panel.

The panel 34 of the top cushion member is spaced approximately at the middle of the cushion to provide cushioning when the top cushion member is used as an arm rest or as the seat part of the hassock, as well as to provide appropriate cushioning when it is used as a back rest for the auxiliary seat.

The panel 36 of the bottom cushion is placed at or near the bottom surface of the cushion. The construction of the bottom cushion member is such that adequate cushioning will be provided if this member is used as the seat part of the auxiliary seat. The small amount of cushioning at the bottom surface of cushion member 12 is merely provided to make the same comfortable to touch when the cushion is tilted upwardly to gain access to the storage compartment of the supporting structure.

A steel bracket 38 is fixed to the panel 34 and is provided with appropriate apertures for receiving screws 28 to thus fix the cushion member 12 to the hinge leaves 26. Similarly, the panel 36 is provided with small reinforcing plates 40 at the location of its connection to hinge leaf 20.

As is known to those familiar with hinges, hinge 15 can be of the type which would limit the upward pivotal movement of the top cushion member to an angle at which proper back support is provided. In the alternative, the cushion member can rest against an appropriate back stop, such as the back wall 41 of the cab in which the seat is installed. If desired, the top cushion member may be secured in the upwardly inclined position by a small strap 42 provided with appropriate hook means which engages pile means 44 secured to the back wall of the cab. The hook and pile means may be of the type marketed under the trademark Velcro and disclosed in U.S. Patent 2,717,437.

As shown, the auxiliary seat embodying the present invention has specific significance when it is mounted adjacent a regular or full size vehicle seat 46. When the cushion members 12 and 14 are in the flat position the top surface 48 of cushion member 12 is at a proper height to form an arm rest for the adjacent seat. When the cushion member 14 is moved to the generally upstanding position, the occupant of the auxiliary seat will sit at the same level as the occupants of the adjacent seat.

If the auxiliary seat is mounted in the space between two adjacent seats, proper arm rest will be provided for the occupants of both seats. Also, because the lower cushion member 12 is at the same height as the seat cushions 50 of the adjacent seats, a comfortable sleeping or "stretch-out" area is provided by the auxiliary seat in combination with the adjacent seats.

Although but two embodiments of the present invention have been illustrated and described, it will be apparent to those skilled in the art that various changes and modifications may be made without departing from the scope of this invention.

We claim:
1. A vehicle seat comprising:
   a supporting structure adapted to be fixed to said vehicle and being in the form of a top open container to which access can be gained from a top opening;
   said supporting structure having a rear wall extending above the plane of said top opening;
   first cushion means pivotally connected to said wall by a first leaf of a hinge means which is mounted at a section of said wall above the plane of said opening and which permits said first cushion means to be pivotally moved between a generally flat position in which said first cushion means overlies said top opening and is supported by the top edges of the other walls of said supporting structure and a generally upstanding position;
   second cushion means having a central relatively rigid frame which frame is connected by a second leaf of said hinge means to said back wall, said second cushion means having cushioning material on both sides of said central frame and being movable by virtue of said hinge means independently of said first cushion means from a generally flat position in which it overlies and is supported by said first cushion means to a generally upstanding position in which it forms the back member of said seat with said first cushion means forming the seat part of the vehicle seat.

2. A vehicle seat according to claim 1 wherein said rear wall extends above the top surface of said first cushion means when the latter is in said generally flat position, with said first leaf extending generally downwardly from the pivotal center of said hinge means and said second leaf spring extending generally upwardly from said center whenever both cushion means are in said generally flat position.

References Cited

UNITED STATES PATENTS

| | | | |
|---|---|---|---|
| 1,049,394 | 1/1913 | Predock | 297—193 |
| 1,356,558 | 10/1920 | Purcell | 297—193 |
| 1,769,343 | 7/1930 | Henry | 297—193 |
| 1,802,620 | 4/1931 | Scully | 297—113 |
| 1,965,048 | 7/1934 | Morris | 297—238 |
| 2,958,369 | 11/1960 | Pitts et al. | 297—232 |
| 2,994,557 | 8/1961 | King | 297—105 |
| 3,103,630 | 9/1963 | Pitts et al. | 297—113 |
| 3,237,824 | 3/1966 | Gunckel | 297—194 |
| 3,263,245 | 8/1966 | Ettinger | 297—380 |

FRANCIS K. ZUGEL, *Primary Examiner.*